(12) United States Patent
Katsumata et al.

(10) Patent No.: US 6,861,589 B2
(45) Date of Patent: Mar. 1, 2005

(54) HARNESS PROTECTOR

(75) Inventors: Toshihiro Katsumata, Susono (JP); Takeshi Miyata, Wako (JP); Yuuji Kage, Wako (JP); Kenichi Munenaga, Wako (JP)

(73) Assignees: Yazaki Corporation, Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/428,118

(22) Filed: May 2, 2003

(65) Prior Publication Data

US 2003/0213607 A1 Nov. 20, 2003

(30) Foreign Application Priority Data

May 14, 2002 (JP) ..................................... P2002-138940
May 14, 2002 (JP) ..................................... P2002-138941

(51) Int. Cl.[7] ................................................. H02G 3/04
(52) U.S. Cl. .................. 174/68.3; 174/72 A; 174/68.1; 174/97; 174/96; 174/48; 174/101
(58) Field of Search .............................. 174/68.3, 72 A, 174/68.1, 97, 96, 48, 101

(56) References Cited

U.S. PATENT DOCUMENTS

| 5,739,470 | A | | 4/1998 | Takeda |
|---|---|---|---|---|
| 6,498,297 | B2 | * | 12/2002 | Samhammer ............. 174/72 A |
| 6,528,728 | B1 | * | 3/2003 | Shima ........................ 174/101 |

FOREIGN PATENT DOCUMENTS

| JP | 4-113979 A | 4/1992 |
|---|---|---|
| JP | 7-329830 A | 12/1995 |
| JP | 8-140234 A | 5/1996 |
| JP | 11-59290 A | 3/1999 |
| JP | 11-136831 A | 5/1999 |
| JP | 2000-13949 A | 1/2000 |
| JP | 2002-010440 A | 1/2002 |
| JP | 2002-051426 A | 2/2002 |

* cited by examiner

*Primary Examiner*—Dean A. Reichard
*Assistant Examiner*—Jinhee Lee

(57) ABSTRACT

An elongated member is formed with a groove extending in a longitudinal direction thereof. A protector body has a harness chamber which accommodates a wire harness therein, and is integrally formed with a retainer which holds a wire-like member. The protector body is detachably attached to the elongated member such that the retainer is accommodated in the groove.

11 Claims, 6 Drawing Sheets

HARNESS PROTECTOR

BACKGROUND OF THE INVENTION

This invention relates to a harness protector, and more particularly to a harness protector which holds a wire-like member, such as a washer hose and an opener cable, in addition to an electric wire, and is mounted on and along a hinge-purpose elongated member, such as a trunk hinge.

One example of related-art protectors for receiving and holding a wire, such as a wire harness, therein is a harness protector (disclosed, for example, in Japanese Patent Publication No. 2000-13949A) in which a plurality of retainers for receiving and retaining a wire-like member, such as a hose for window washer and a cable for a rear door opener of a vehicle, are formed on an outer wall of a protector body which receives and holds a wire harness (electric wire) therein.

Such a harness protector is fixed at a predetermined mounting position by retainingly engaging anchors, which are formed integrally with the protector body, in retaining holes formed in a mounting face (panel face of a vehicle body) or by screw-fastening bracket portions.

In a case where electrical devices such as lamps are provided at a trunk lid, a rear hatch gate or the like, the harness protector is mounted along a hinge-purpose elongated member forming a hinge mechanism for the trunk lid, the rear hatch gate or the like.

The wire harness is received and held in the protector body formed into a shape corresponding to the configuration of the hinge-purpose elongated member, and also the wire-like member is retainingly fitted in the retainers formed on the outer wall of the protector body.

However, when the above harness protector is mounted on and along the hinge-purpose elongated member, the protector body, receiving and holding the wire harness therein, is disposed at the outer face of the elongated member, and the wire-like member retained by the retainers, is disposed on the further outer side of the protector body.

Therefore, the above harness protector, installed along the hinge-purpose elongated member, has a problem that a space for receiving this protector is not good in efficiency, and is large. Particularly, the hinge-purpose elongated member for a trunk lid or a rear hatch gate is exposed to a passenger compartment of a vehicle in a closed condition of the trunk lid or the rear hatch gate, and therefore when the mounting space for the harness protector is large, the amount of projecting of the protector into the trunk or the passenger compartment increases, so that the protector may interfere with luggage and the passenger.

And besides, the wire-like member retained by the retainers formed on the outer wall of the protector body, is exposed to the exterior face of the harness protector, and therefore this wire-like member is not desirable from an aesthetical point of view, and also is liable to be affected by an external force. Particularly, the hinge-purpose elongated member for the rear hatch gate is exposed to the passenger compartment of the car even in the closed condition of the rear hatch gate, and is located at the portion always exposed to the eyes of the passengers, and therefore the wire-like member, exposed to the face of the harness protector, is not pleasing in appearance.

Further, for mounting the above harness protector on the hinge-purpose elongated member, this protector is fixed by fitting anchors respectively into a plurality of retaining holes formed at suitable intervals in the hinge-purpose elongated member. Therefore, the securing force of the harness protector to the hinge-purpose elongated member is determined by the number of the anchors. However, it is difficult to increase the number of the retaining holes, formed in the elongated member which is required to have a predetermined stiffness.

And besides, when mounting the harness protector, the plurality of anchors must be inserted respectively into the retaining holes while positioning each anchor relative to the corresponding retaining hole, and the anchors are tend to be damaged when detaching the harness protector, and therefore there is encountered a problem that the attaching and detaching workability is not good.

SUMMARY OF THE INVENTION

It is therefore an object of this invention to provide a protector which reduces a space for mounting a protector on a hinge-purpose elongated member, and is excellent in appearance.

It is also an object of this invention to provide a protector in which the mount securing ability of the protector with respect to the hinge-purpose elongated member, and the workability of attaching and detaching of the protector relative to the hinge-purpose elongated member, are enhanced.

In order to achieve the above objects, according to the invention, there is provided a harness protector, comprising:

an elongated member, formed with a groove extending in a longitudinal direction thereof; and a protector body, having a harness chamber which accommodates a wire harness therein, and integrally formed with a retainer which holds a wire-like member, the protector body being detachably attached to the elongated member such that the retainer is accommodated in the groove.

In such a configuration, when the protector body, receiving and holding the wire harness therein, is mounted on the elongated member, the wire-like member, held by the retainer of the protector body, is received in the groove in the elongated member, and only the protector body is disposed at the exterior face of the elongated member.

Therefore, the mounting space can be made smaller as compared with the related-art protector in which the wire-like member, held by the retainer, is disposed on the outer side of the protector body.

And besides, since the wire-like member will not be exposed to the exterior face of the protector, the appearance within a passenger compartment of a car can be made pleasing.

Preferably, the retainer is provided outside the harness chamber.

In this case, the wire-like member can meet not only the unitary assemblage, in which the wire-like member, together with the wire harness, is attached to the protector body relative to the elongated member, but also a post-assemblage in which the wire-like member is alone attached to the protector body relative to the elongated member at a later stage. Therefore, the degree of freedom of mounting of the wire-like member is enhanced in the assembling operation.

Preferably, the protector body is placed at a predetermined position with respect to the elongated member by inserting the retainer into the groove.

It is further preferable that the protector body comprises a projection provided on the retainer, and the elongated member is formed with a hole into which the projection is to be fitted in a case where the retainer is inserted into the groove.

In this case, the efficiency of the operation for mounting the protector body on the elongated member is enhanced.

Preferably, the harness protector further comprises a cover member which accommodates at least the elongated member therein, the cover member to be mounted on a hinge part of a vehicle body.

In this case, since the mount securing ability of the protector is determined by the securing force between the protector body and the cover member, the mount securing ability of the protector can be easily increased regardless of the structure of the hinge-purpose elongated member.

And besides, the protector body and the cover member, which are molded of an electrically-insulative synthetic resin or the like, can be attached and detached relative to each other by the retaining member of a simple structure. Therefore, the positioning operation during the attaching operation is easier, and the retaining member will not be easily damaged during the detaching operation, and the attaching and detaching ability is enhanced.

Here, it is preferable that the cover member accommodates therein both of the protector body and the elongated member.

In this case, since both of the elongated member and the protector body are covered with the cover member, the appearance within the passenger compartment of the car can be made pleasing.

It is also preferable that the elongated member comprises a hinge damper on a face opposite to a face in which the groove is formed.

In this case, an installation space for the wire harness and the wire-like member will not be limited by the interference with the hinge damper.

It is also preferable that the cover member is detachably attached to the protector body so as to accommodate at least the retainer and the elongated member.

Here, it is further preferable that the cover member accommodates therein both of the protector body and the elongated member.

It is also preferable that a shading member is provided at least one of longitudinal ends of the cover member so as to cover an opening formed on the vehicle body into which one longitudinal end of the elongated member is to be inserted.

In this case, the inside is prevented from being viewed through the gap between the edge of the opening in the mounting portion (such as a roof lining or a rear hatch gate lining) and the elongated member, so that the appearance in the vicinity of the hinge is enhanced.

It is also preferable that the cover member comprises an engagement member operable to engage with the elongated member.

In this case, the harness protector is prevented from being displaced in a longitudinal direction of the elongated member.

Further, since the protector body can be provisionally retained on the elongated member before the cover member is attached to the protector body, the working efficiency of the assembling operation is enhanced.

Still further, even if the cover member is disengaged, the protector body is prevented from being disengaged from the elongated member.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
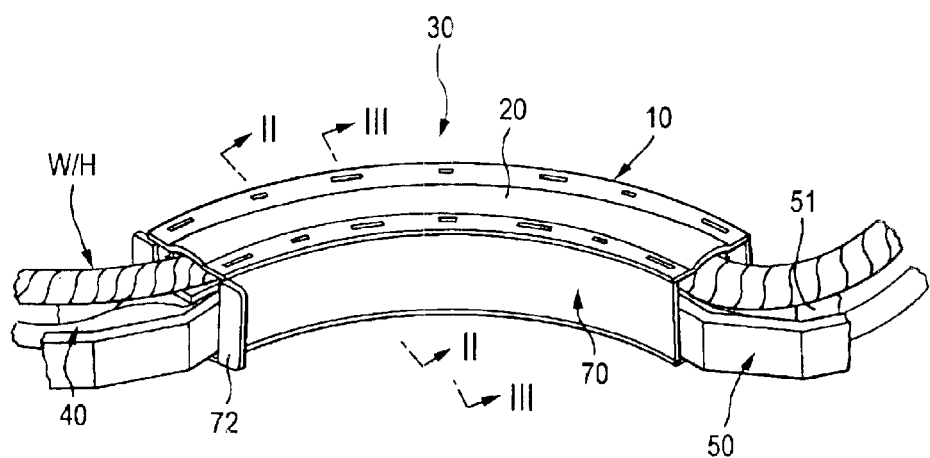
FIG. 1 is a perspective view of a harness protector according to a first embodiment of the invention.

Preferred embodiment of a harness protector of the invention will now be described in detail with reference to the accompanying drawings.

As shown in FIGS. 1 to 4, a harness protector 30 according to a first embodiment includes a protector body 10 which is provided with a lid 20, and has a wire receiving space therein for receiving and holding a wire harness (electric wire) W/H, and this protector body 10 is made of an electrically-insulative synthetic resin, and is formed into an elongated arcuate shape corresponding to a longitudinal shape of a hinge-purpose elongated member 50. The hinge-purpose elongated member 50 forms a hinge mechanism of a rear hatch gate, and is a metal member of a U-shaped cross-section having a groove 51 formed in one side face thereof (upper face in the drawings) and extending along a length thereof.

A wire-like member retainers 60 for holding a washer hose 40 (which is a wire-like member) are formed integrally with the protector body 10, and a cover member 70 elongated corresponding to the longitudinal shape of the hinge-purpose elongated member 50 is detachably attached to the protector body 10.

Figure 2:
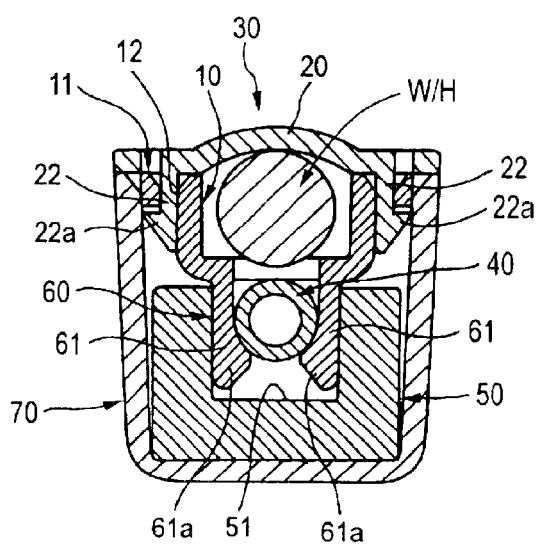
FIG. 2 is a cross-sectional view taken along the line II—II of FIG. 1.
Figure 3:
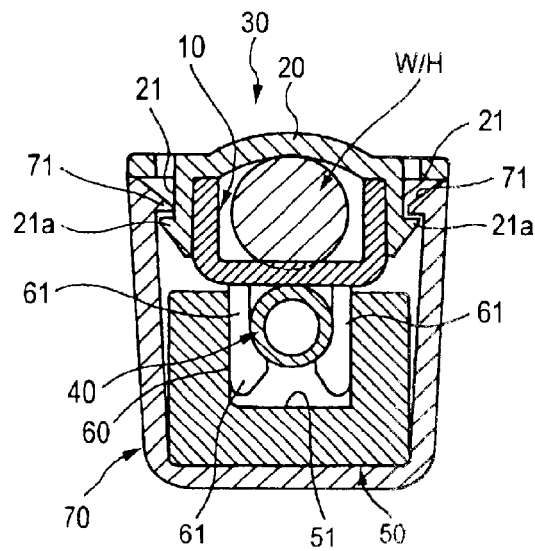
FIG. 3 is a cross-sectional view taken along the line III—III of FIG. 1.
Figure 4:
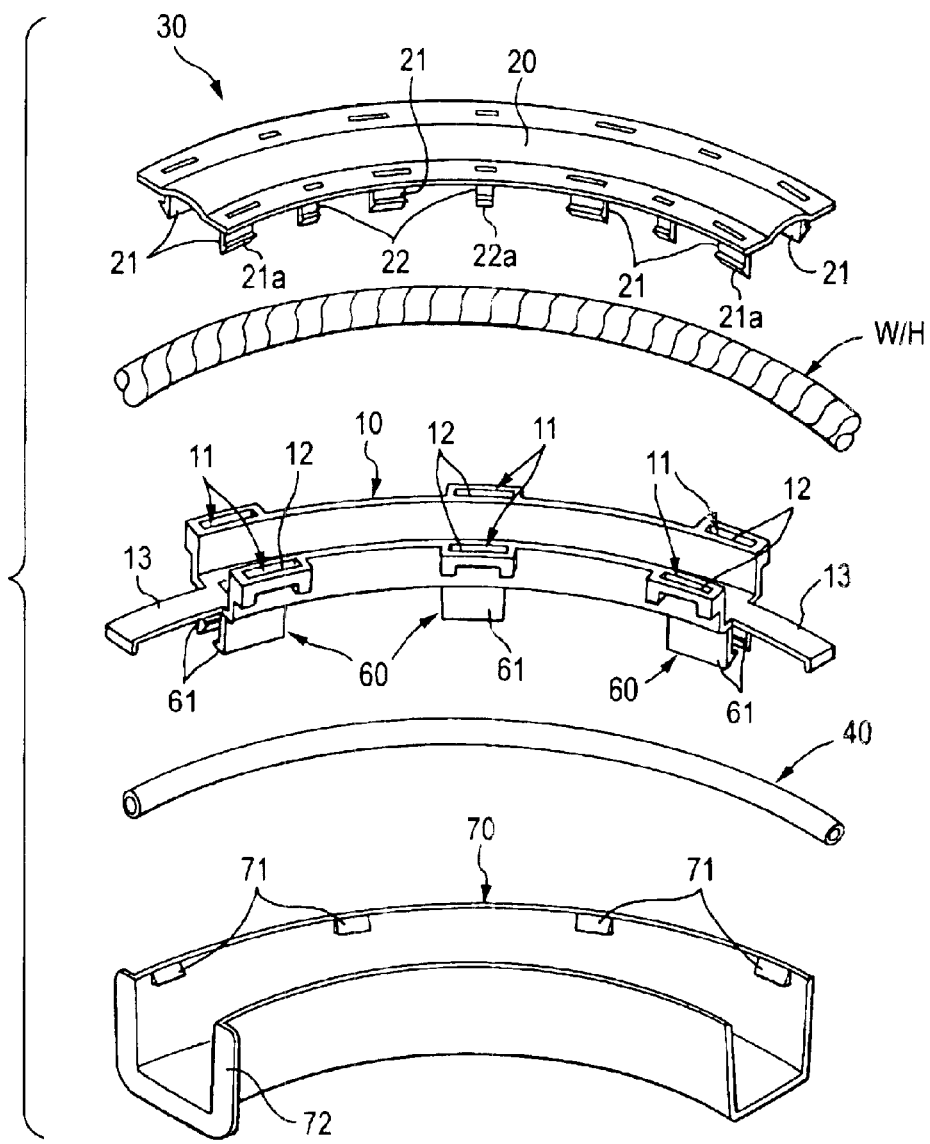
FIG. 4 is an exploded, perspective view of the harness protector shown in FIG. 1.

As shown in FIGS. 2 to 4, pairs of elastic pieces 21 and pairs of elastic pieces 22 are alternately formed on an inner face of the lid 20, and are arranged at generally equal intervals in the longitudinal direction of the lid 20. Each pair of elastic pieces 21, 22 is formed respectively on opposite side edge portions of the lid 20, and projecting downwardly therefrom. An engagement projection 21a for engagement with a retaining projection 71 (described later) is formed at a lower end of each elastic piece 21, while an engagement projection 22a for engagement with a retaining portion 11 (described later) is formed at a lower end of each elastic piece 22.

As shown in FIGS. 2 to 4, the protector body 10, which is slightly smaller in longitudinal length than the lid 20, has an upwardly-open (in the drawings) U-shaped cross-section, and has the wire receiving space therein through which the wire harness W/H can pass to be received therein.

The plurality of pairs of retaining portions 11 are formed respectively at three portions of the protector body 10, and are spaced from one another in the longitudinal direction, and are arranged at the same pitch as that of the elastic pieces 22, each pair of retaining portions 11 being formed on opposed side walls of the protector body 10, respectively. When the distal end of each elastic piece 22 is passed through a retaining hole 12 in the corresponding retaining portion 11, the engagement projection 22a is retained by the retaining portion 11, so that the lid 20 can be detachably attached to the protector body 10 (see FIG. 2).

As shown in FIGS. 2 to 4, the wire-like member retainers 60, each comprising a pair of retaining pieces 61 (which are formed respectively on opposite side edge portions of a bottom face of the protector body 10 disposed exteriorly of the wire receiving space), are formed respectively at three portions of the protector body 10, and are spaced from one another in the longitudinal direction of the protector body 10. A retaining projection 61a for retaining the washer hose 40 held between the pair of retaining pieces 61 is formed on an inner face of each retaining piece 61 at a distal end thereof.

Further, fixing pieces 13 are formed at and project from longitudinal opposite ends of the bottom wall of the protector body 10, respectively, as shown in FIG. 4, and the wire harness W/H is adapted to be fixed to each fixing piece 13 by winding an adhesive tape or the like therearound.

As shown in FIGS. 2 to 4, the cover member 70 is formed into the elongated arcuate shape corresponding to the longitudinal shape of the hinge-purpose elongated member 50, and has an upwardly-open (in the drawings) U-shaped cross-section, and a width of an inner face of a bottom portion of the cover member 70 is substantially equal to the width of the hinge-purpose elongated member 50.

The plurality of pairs of retaining projections 71 are formed respectively at four portions of the cover member 70, and are spaced from one another in the longitudinal direction of the cover member 70 so as to be arranged at the same pitch as that of the elastic pieces 21. Each pair of retaining projections 71 is formed respectively on inner faces of upper end portions of opposed side walls of the cover member 70. When the engagement projection 21a of each elastic piece 21 is retained by the corresponding retaining projection 71, the cover member 70 is detachably attached to the protector body 10 (see FIG. 3).

Further, a covering rib 72 is perpendicularly formed at one longitudinal end of the cover member 70, and this covering rib covers a gap between the hinge-purpose elongated member 50 and an edge of an opening in a roof lining (which is not shown, and serves as a mounting portion) through which the hinge-purpose elongated member 50 passes.

For installing the wire harness W/H on the hinge-purpose elongated member 50 by the use of the harness protector 30 of this embodiment, the wire harness W/H is first laid on and along the bottom wall of the protector body 10, and is fixedly secured to the fixing pieces 13 by winding the adhesive tape.

Then, the elastic pieces 22 on the lid 20 are brought into retaining engagement with the retaining portions 11 of the protector body 10, respectively, in such a manner that the upper opening in the protector body 10 is closed by the lid 20, so that the lid 20 is attached to the protector body 10.

Then, the washer hose 40 is forced into the gap between each pair of retaining pieces 61, formed on the bottom face of the protector body 10, so that the washer hose 40 is held by the wire-like member retainers 60.

Then, the protector body 10 is mated with the hinge-purpose elongated member 50 in such a manner that the wire-like member retainers 60, holding the washer hose 40, are received in the groove 51. Thereafter, the cover member 70 is attached to the protector body 10 in such a manner that this cover member 70 covers the periphery of the hinge-purpose elongated member 50, as well as the wire-like member retainers 60 holding the washer hose 40. At this time, the elastic pieces 21 are retainingly engaged with the retaining projections 71, respectively, so that the cover member 70 is detachably fixed to the protector body 10.

At this time, the wire-like member retainers 60 are received in the groove 51, so that the protector body 10 is positioned and fixed (provisionally fixed) relative to the hinge-purpose elongated member 50, and therefore the efficiency of the operation for mounting the protector body 10 on the hinge-purpose elongated member 50 is enhanced. The elastic pieces 21 are retainingly engaged with the retaining projections 71, respectively, so that the cover member 70 is detachably fixed to the protector body 10.

Namely, when the protector body 10, having the wire harness W/H received and held in the wire receiving space thereof, is mounted on the hinge-purpose elongated member 50, the washer hose 40, held by the wire-like member retainers 60 of the protector body 10, is received in the groove 51 in the hinge-purpose elongated member 50, and only the protector body 10 is disposed at the external face of the hinge-purpose elongated member 50.

Therefore, the mounting space can be made smaller as compared with the related-art protector in which the wire-like member, held by the wire-like member retainers, is disposed on the outer side of the protector body.

Namely, in the harness protector 30, the amount of projecting of the hinge-purpose elongated member 50 (for the rear hatch gate) into a passenger compartment of a vehicle in a closed condition of the rear hatch gate is reduced, and this protector is less liable to interfere with luggage and the passenger.

Further, since the cover member 70 is attached to the protector body 10 in such a manner that this cover member 70 covers the periphery of the hinge-purpose elongated member 50, the mount securing ability of the harness protector 30 is determined by the securing force between the protector body 10 and the cover member 70 (the retaining force between the elastic pieces 21 and the retaining projections 71 in this embodiment). Therefore, it is not necessary to form any retaining holes in the hinge-purpose elongated member as in the related-art harness protector, and the mount securing ability of the harness protector 30 can be easily increased regardless of the structure of the hinge-purpose elongated member 50.

And besides, the protector body 10 and the cover member 70, which are molded of an electrically-insulative synthetic resin or the like, can be attached and detached relative to each other by the retaining members of the simple structure comprising the elastic pieces 21 and the retaining projections 71. Therefore, as compared with the anchors of the related-art harness protector, the positioning operation during the attaching operation is easier, and any damage as encountered with the anchors will not occur during the detaching operation. Therefore, the ability of attaching and detaching of the harness protector relative to the hinge-purpose elongated member 50 is enhanced.

In addition, the washer hose 40, held by the wire-like member retainers 60 of the protector body 10, as well as the hinge-purpose elongated member 50, is covered with the cover member 70, and will not be exposed to the exterior face of the harness protector 30, and therefore the appearance within a passenger compartment of a car can be made pleasing.

Furthermore, the covering rib 72 prevents the inside from being viewed through the gap between the edge of the opening in the roof lining and the hinge-purpose elongated member 50, so that the appearance in the vicinity of the hinge is enhanced.

The wire-like member retainers 60 of the harness protector 30 are provided exteriorly of the wire receiving space in the protector body 10 in which space the wire harness W/H is received and held.

Therefore, the washer hose 40 is not limited to the unitary assemblage in which the washer hose 40, together with the wire harness W/H, is attached to the protector body 10 relative to the hinge-purpose elongated member 50 as described above, but the washer hose 40 can meet a post-assemblage in which the washer hose 40 is alone attached to the protector body 10 relative to the hinge-purpose elongated member 50 at a later stage. Therefore, the degree of freedom of mounting of the washer hose 40 is enhanced in the assembling operation.

Figure 5:
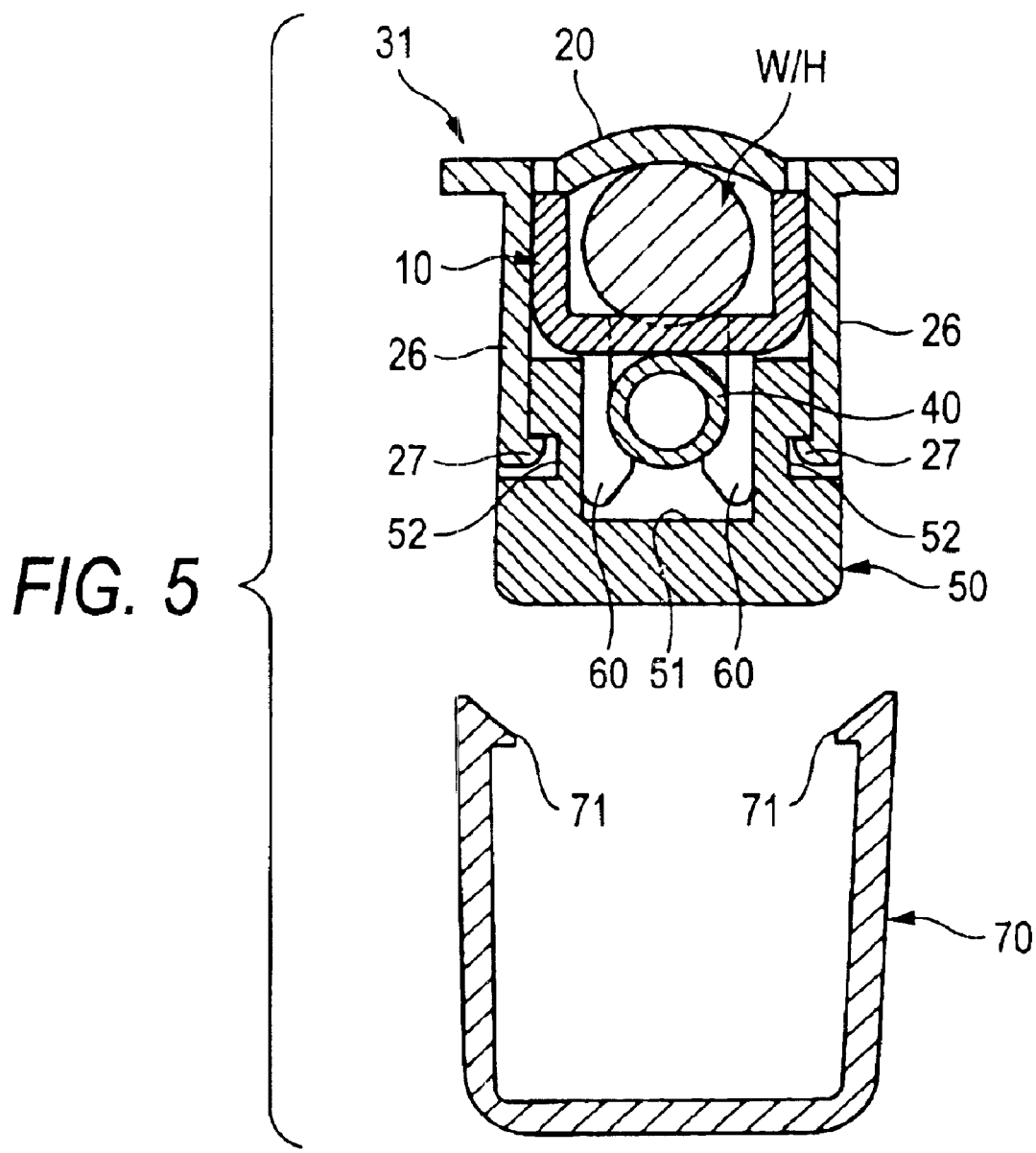
FIG. 5 is a transverse cross-sectional view of a harness protector according to a second embodiment of the invention.

FIG. 5 is a transverse cross-sectional view of a harness protector 31 according to a second embodiment of the invention. Similar constituent parts to those of the harness protector 30 of the first embodiment will be designated by identical reference numerals, respectively, and detailed explanation thereof will be omitted.

In the harness protector 31 of this embodiment, in addition to elastic pieces 21 and 22 as described above, a plurality of pairs of elastic pieces 26 are formed on an inner face of a lid 20. Each pair of elastic pieces 26 is formed on and projecting respectively from opposite side edge portions of the lid 20. Retaining projections 27 of the elastic pieces 26 are retainingly engaged respectively in retaining recesses 52 formed in opposite side faces of a hinge-purpose elongated member 50, so that a protector body 10 is detachably attached to the hinge-purpose elongated member 50.

The retaining projections 27 are held respectively against inner faces of the retaining recesses 52, thereby preventing the harness protector 31 from being displaced in a longitudinal direction of the hinge-purpose elongated member 50.

And besides, the elastic pieces 26 can provisionally retain the protector body 10 on the hinge-purpose elongated member 50 before a cover member 70 is attached to the protector body 10, and therefore the efficiency of the assembling operation is enhanced.

Furthermore, even if the cover member 70 for the harness protector 31, attached to the hinge-purpose elongated member 50, is disengaged, the protector body 10, retained by the elastic pieces 26, is prevented from being disengaged from the hinge-purpose elongated member 50.

As shown in FIGS. 6 to 11, a harness protector 80 according to a third embodiment includes a protector body 90 having a wire receiving space therein for receiving and holding a wire harness (wire) W/H, and this protector body 90 is made of an electrically-insulative synthetic resin, and is formed into an elongated arcuate shape corresponding to a longitudinal shape of a hinge-purpose elongated member 55.

The hinge-purpose elongated member 55 forms a hinge mechanism of a rear hatch gate, and is a metal member of a U-shaped cross-section having a groove 56 formed in one side face thereof and extending along a longitudinal direction of the elongated member 55. A stepped retaining hole 57 is formed through a bottom portion of the groove 56.

A cover member 100 is formed into an elongated shape corresponding to the longitudinal shapes of the hinge-purpose elongated member 55 and protector body 90 so as to hold both of them in an embracing manner, and this cover member 100 is detachably attached to the hinge-purpose elongated member 55 and the protector body 90.

As shown in FIGS. 7 to 10, the protector body 90 has an downwardly-open (in the drawings) U-shaped cross-section, and has the wire receiving space therein through which the wire harness W/H can pass to be received therein.

A plurality of pairs of elastic pieces 95 are formed respectively at two portions of the protector body 90, and are spaced from each other in the longitudinal direction of the protector body 90. Each pair of elastic pieces 95 is formed on and projecting respectively from inner faces of opposed side walls of the protector body 90 at lower edges thereof. When the wire harness W/H is forced through slits each formed between distal ends of the corresponding pair of opposed elastic pieces 95, this wire harness W/H is received and held in the wire receiving space (see FIGS. 8 and 9).

Figure 11:
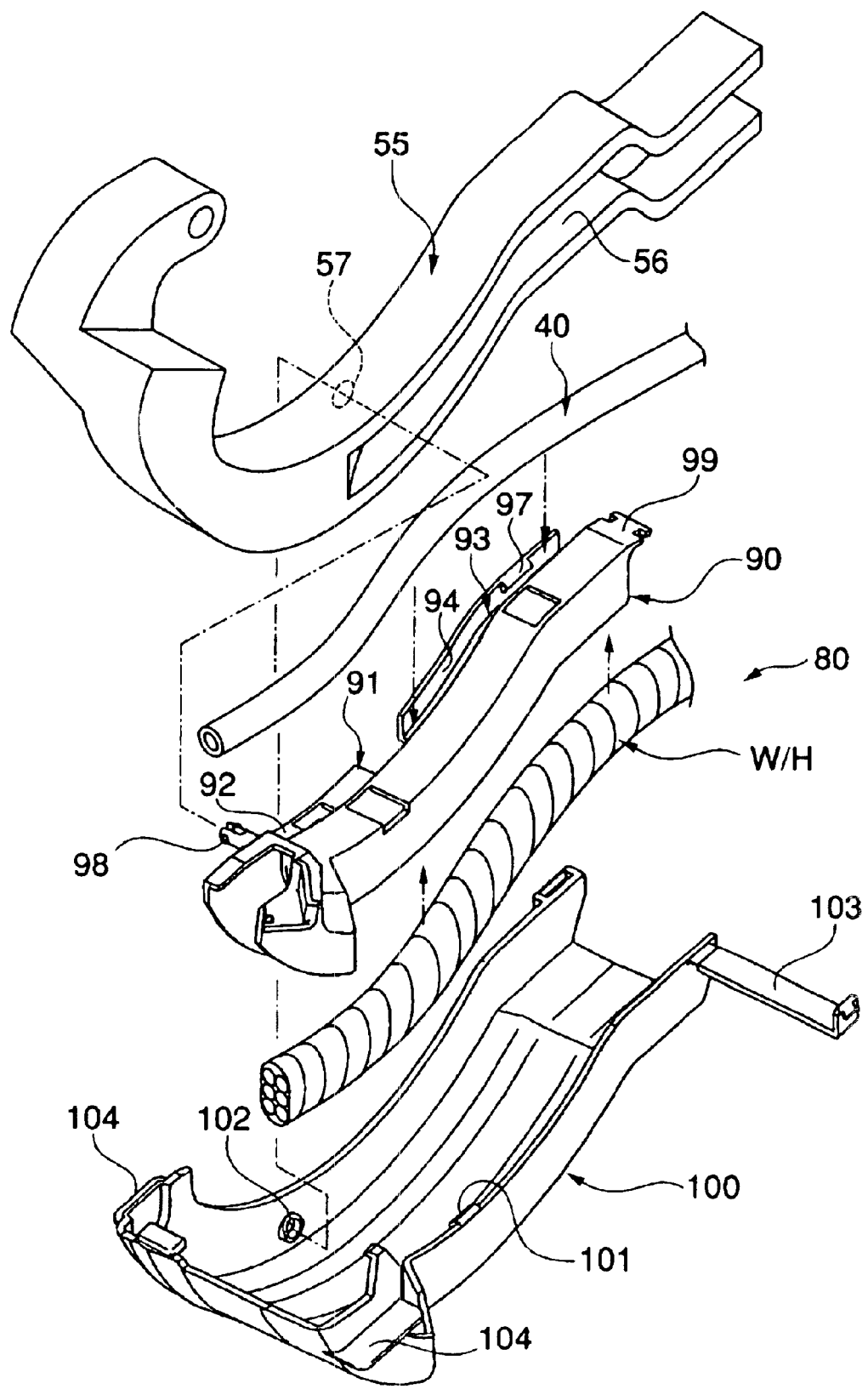
FIG. 11 is an exploded, perspective view of the harness protector shown in FIG. 6.

As shown in FIG. 11, wire-like member retainers 91 and 93 for holding a washer hose 40 (which is a wire-like member) are formed respectively on two portions of one side face (right side face in the drawings) of the protector body 90, disposed exteriorly of the wire receiving space, and are spaced from each other in the longitudinal direction.

Figure 7:
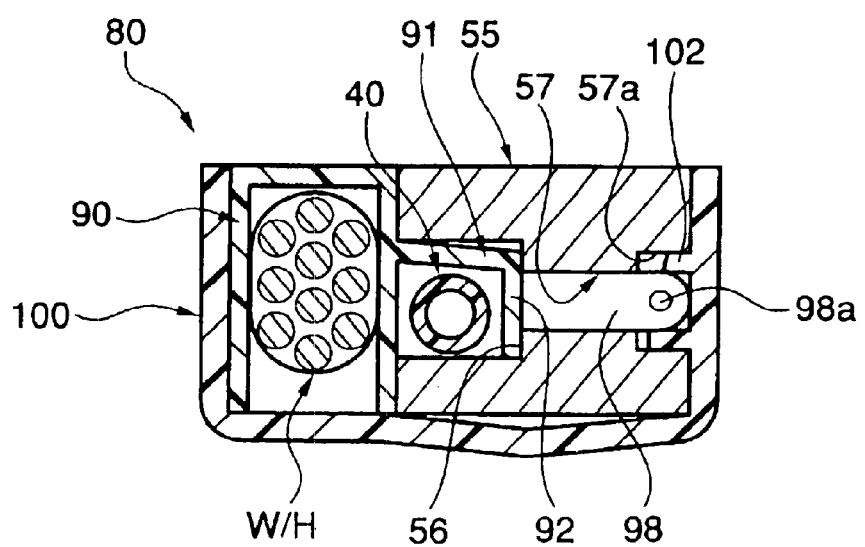
FIG. 7 is a cross-sectional view taken along the line VII—VII of FIG. 6.
Figure 8:
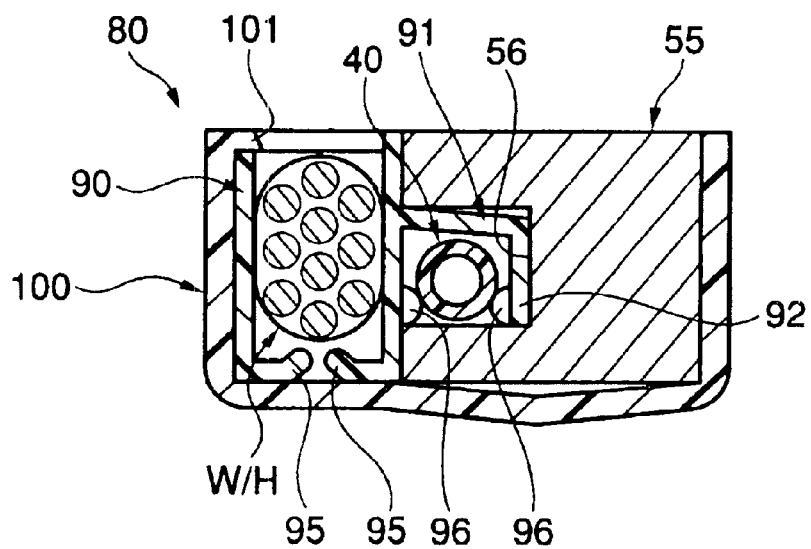
FIG. 8 is a cross-sectional view taken along the line VIII—VIII of FIG. 6.

As shown in FIGS. 7 and 8, the wire-like member retainer 91 comprises a retaining piece 92 of a downwardly-open (in the drawings) L-shaped cross-section, and retaining projections 96 for retaining the washer hose 40, held between the retaining piece 92 and the side face of the protector body 90, are formed respectively on an inner face of a distal end of the retaining piece 92 and that portion of the side face of the protector body 90 which are opposed to each other.

As shown in FIG. 7, an engagement projection 98 of a generally cylindrical shape to be inserted into the stepped retaining hole 57 is formed on and projects from an outer face of the retaining piece 92. Small projections 98a for retaining engagement with a step portion of a larger-diameter portion 57a of the stepped retaining hole 57 are formed on an outer face of a bifurcated distal end portion of the engagement projection 98.

Figure 9:
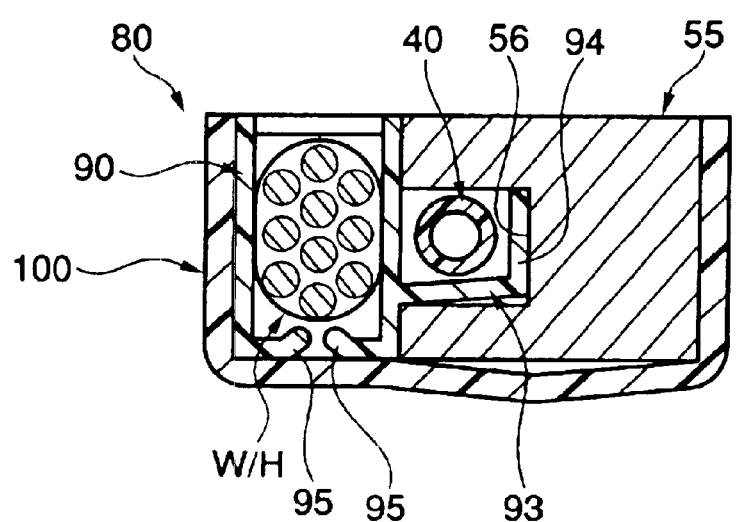
FIG. 9 is a cross-sectional view taken along the line IX—IX of FIG. 6.
Figure 10:
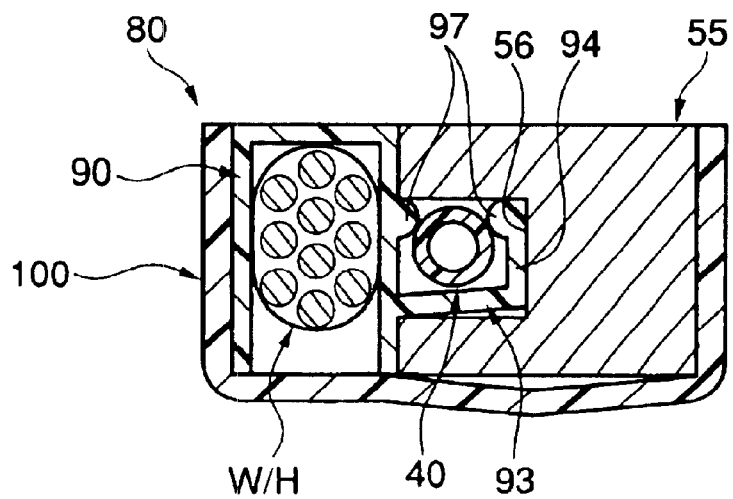
FIG. 10 is a cross-sectional view taken along the line X—X of FIG. 6.

As shown in FIGS. 9 and 10, the wire-like member retainer 93 comprises a retaining piece 94 of an upwardly-open (in the drawings) L-shaped cross-section, and retaining projections 97 for retaining the washer hose 40, held between the retaining piece 94 and the side face of the protector body 90, are formed respectively on an inner face of a distal end of the retaining piece 94 and that portion of the side face of the protector body 90 which are opposed to each other.

As shown in FIG. 11, a fixing piece 99 is formed at and projects from one longitudinal end of a bottom wall of the protector body 90, and the wire harness W/H is adapted to be fixed to this fixing piece by winding an adhesive tape or the like therearound.

As shown in FIGS. 7 to 11, the cover member 100 has an upwardly-open U-shaped cross-section, and is formed into the elongated arcuate shape corresponding to the longitudinal shapes of the hinge-purpose elongated member 55 and protector body 90, and a width of an inner face of a bottom portion of the cover member 100 is substantially equal to the sum of the widths of the hinge-purpose elongated member 55 and protector body 90 so that the cover member 100 can hold both of the hinge-purpose elongated member 55 and the protector body 90 in an embracing manner.

A retaining projection 101 and a retaining band 103 are formed on one side wall of the cover member 100 at an upper edge thereof, and an engagement projection 102 is formed on an inner face of the other side wall thereof.

The retaining projection 101 is retainingly engaged with the upper edge of the protector body 90 as shown in FIG. 8, and also the engagement projection 102 is retainingly engaged in the larger-diameter portion 57a of the stepped retaining hole 57, formed in the hinge-purpose elongated member 55, as shown in FIG. 7, so that the cover member 100 can be detachably attached to the protector body 90 and the hinge-purpose elongated member 55.

Further, a covering rib 104 is perpendicularly formed at one longitudinal end of the cover member 100, and this covering rib covers a gap between the hinge-purpose elongated member 55 and an edge of an opening in a roof lining (which is not shown, and serves as a mounting portion) through which the hinge-purpose elongated member 55 passes.

For installing the wire harness W/H on the hinge-purpose elongated member 55 by the use of the harness protector 80 of this embodiment, the wire harness W/H is first forced through the slits, each formed between the distal ends of the corresponding pair of elastic pieces 95, and is mated with the bottom wall of the protector body 90, and is fixedly secured to the fixing piece 99 by winding the adhesive tape.

Then, the washer hose 40 is forced into the wire-like member retainer 91 (formed on the one side face of the protector body 90) through the lower opening thereof, and also is forced into the wire-like member retainer 93(formed on the one side face of the protector body 90) through the upper opening thereof, so that the washer hose 40 is held in the wire-like member retainers 91 and 93.

Then, the protector body 90 is mated with the hinge-purpose elongated member 55 in such a manner that the wire-like member retainers 91 and 93, holding the washer hose, are received in the groove 56, and thereafter the cover member 100 is attached to the hinge-purpose elongated member 55 and the protector body 90 in such a manner that this cover member holds both of the hinge-purpose elongated member 55 and the protector body 90 in an embracing manner.

At this time, the wire-like member retainers 91 and 93 are received in the groove 56, and also the engagement projection 98 is inserted into the stepped retaining hole 57, and is retained relative thereto, so that the protector body 90 is positioned and fixed (provisionally fixed) relative to the hinge-purpose elongated member 55. Therefore, the efficiency of the operation for mounting the protector body 90 on the hinge-purpose elongated member 55 is enhanced.

The retaining projection 101 is retainingly engaged with the upper edge of the protector body 90, and the engagement projection 102 is retainingly engaged in the larger-diameter portion 57a in the hinge-purpose elongated member 55, and the retaining band 103 is fastened, so that the cover member 100 is detachably attached to the hinge-purpose elongated member 55 and the protector body 90 to hold both of the hinge-purpose elongated member 55 and the protector body 90 in an embracing manner.

Namely, when the protector body 90, having the wire harness W/H received and held in the wire receiving space thereof, is attached to the hinge-purpose elongated member 55, the washer hose 40, held in the wire-like member retainers 91 and 93, is received in the groove 56 in the hinge-purpose elongated member 55, and only the protector body 90 is disposed at the exterior face of the hinge-purpose elongated member 55.

Therefore, the harness protector 80 of this embodiment can make its mounting space smaller as compared with the related-art protector in which the wire-like member, held in the wire-like member retainer, is provided on the outer side of the protector body.

Namely, in the harness protector 80, the amount of projecting of the hinge-purpose elongated member 55 (for the rear hatch gate) into a passenger compartment of a car in a closed condition of the rear hatch gate is reduced, and this protector is less liable to interfere with luggage and the passenger.

And besides, the washer hose 40, held in the wire-like member retainers 91 and 93, is received in the groove 56 in the hinge-purpose elongated member 55, and will not be exposed to the exterior face of the harness protector 80, so that the appearance within the passenger compartment can be made pleasing.

Furthermore, the covering rib 104, formed perpendicularly at the one longitudinal end of the cover member 100, prevents the inside from being viewed through the gap between the edge of the opening in the roof lining and the hinge-purpose elongated member 55, so that the appearance in the vicinity of the hinge is enhanced.

Furthermore, since the cover member 100 is attached to the hinge-purpose elongated member 55 and the protector body 90 to be integrally connected thereto in such a manner that the cover member 100 holds both of the hinge-purpose elongated member 55 and the protector body 90 in an embracing manner, both of the hinge-purpose elongated member 55 and the protector body 90 are covered with the cover member 100, so that the appearance within the passenger compartment can be made more pleasing.

The wire-like member retainers 91 and 93 of the harness protector 80 are provided exteriorly of the wire receiving space in the protector body 90 in which space the wire harness W/H is received and held.

Therefore, the washer hose 40 is not limited to the unitary assemblage in which the washer hose 40, together with the wire harness W/H, is attached to the protector body 90 relative to the hinge-purpose elongated member 55 as described above, but the washer hose 40 can meet a post-assemblage in which the washer hose 40 is alone attached to the protector body 90 relative to the hinge-purpose elongated member 55 at a later stage. Therefore, the degree of freedom of mounting of the washer hose 40 is enhanced in the assembling operation.

Figure 6:
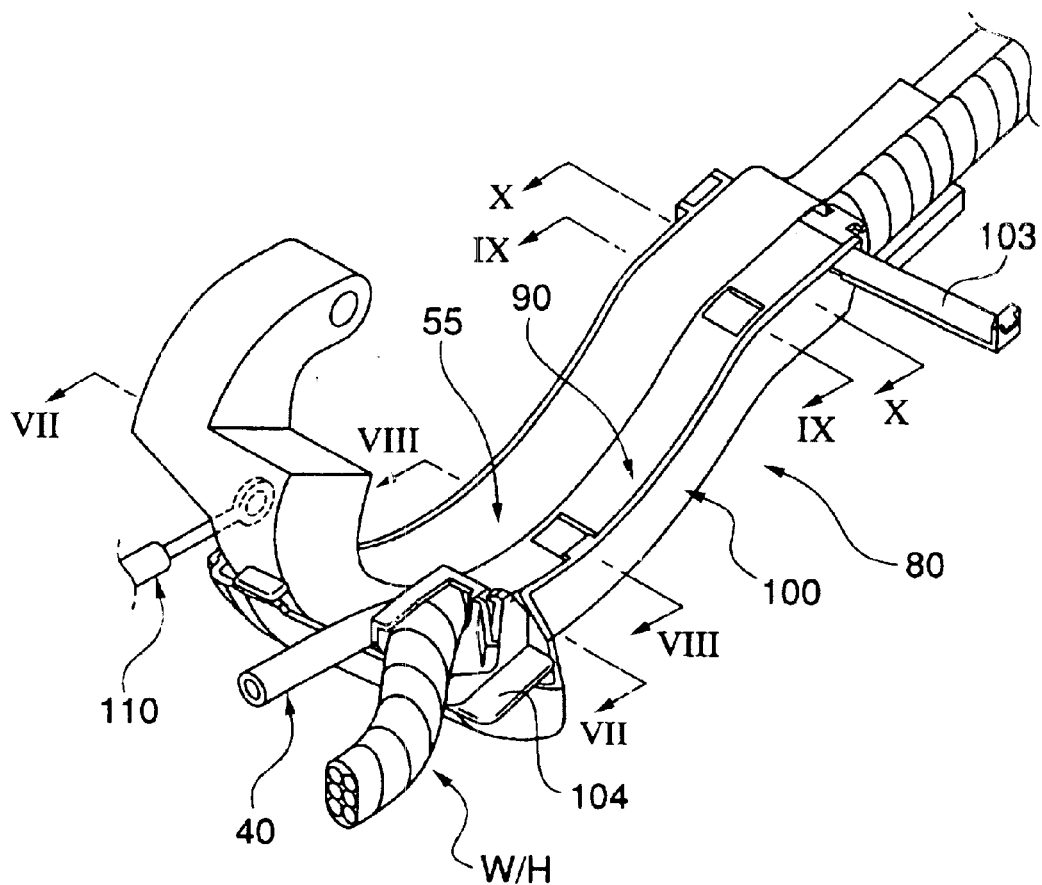
FIG. 6 is a perspective view of a harness protector according to a third embodiment of the invention.

Still further, as shown in FIG. 6, a hinge damper 110 is connected to that side face of the hinge-purpose elongated member 55 facing away from the side face thereof in which the groove 56 is formed.

Since the wire harness W/H and the washer hose 40 are installed along the groove 56 in the hinge-purpose elongated member 55, they will not interfere with the hinge damper 110 when they are installed on a vehicle body, Therefore, an installation space, provided at the vehicle body for the purpose of installing the wire harness W/H and the washer hose 40, will not be limited by the interference with the hinge damper 110, and the degree of freedom of installation, as well as the efficiency of the installing operation, is enhanced.

The constructions of the protector body, cover member, hinge-purpose elongated member, wire-like member, etc., of the harness protector of the invention are not limited to those described in the above embodiments, and they can take various forms in accordance with the subject matter of the invention.

For example, in the above embodiments, although the washer hose 40, serving as the wire-like member, is held by the wire-like member retainers 60 (91 and 93), any other wire-like member, such as a cable for a rear door opener, may be used.

Each of the protector body, the cover member, etc., may take various shapes in accordance with the configuration of the hinge-purpose elongated member, and the wire-like member retainer may take various shapes in accordance with the configuration of the wire-like member.

In the above embodiments, the electric wire and the wire-like member are provided at one side face of the hinge-purpose elongated member in such a manner that the wire and the wire-like member are arranged in two stages. However, for example, in a case where the hinge-purpose elongated member has a wide rectangular cross-section, the electric wire and the wire-like member may be provided in a juxtaposed, manner on the same face of the hinge-purpose elongated member.

Furthermore, instead of using the cover member 70 or 100, lip portions or retaining pieces may be formed on the protector body so that the protector body can be attached directly to the hinge-purpose elongated member.

What is claimed is:

1. A harness protector, comprising:
   an elongated member, formed with a groove extending in a longitudinal direction thereof; and
   a protector body, having a harness chamber which accommodates a wire harness therein, and integrally formed with a retainer which holds a wire-like member, the protector body being detachably attached to the elongated member so that the retainer is accommodated in the groove.

2. The harness protector as set forth in claim 1, wherein the retainer is provided outside the harness chamber.

3. The harness protector as set forth in claim 1, wherein the protector body is placed at a predetermined position with respect to the elongated member by inserting the retainer into the groove.

4. The harness protector as set forth in claim 3, wherein the protector body comprises a projection provided on the retainer, and the elongated member is formed with a hole into which the projection is to be fitted when the retainer is inserted into the groove.

5. The harness protector as set forth in claim 1, further comprising a cover member which accommodates the elongated member therein, the cover member to be mounted on a hinge part of a vehicle body.

6. The harness protector as set forth in claim 5, wherein the cover member accommodates therein both of the protector body and the elongated member.

7. The harness protector as set forth in claim 5, wherein the elongated member comprises a hinge damper on a face opposite to a face in which the groove is formed.

8. The harness protector as set forth in claim 5, wherein the covet member is detachably attached to the protector body so as to accommodate at least the retainer and the elongated member.

9. The harness protector as set forth in claim 8, wherein the cover member accommodates therein both of the protector body and the elongated member.

10. The harness protector as set forth in claim 5, wherein a shading member is provided at one of two longitudinal ends of the cover member to cover an opening formed on the vehicle body into which one longitudinal end of the elongated member is to be inserted.

11. The harness protector as set forth in claim 5, wherein the cover member comprises an engagement member operable to engage with the elongated member.

* * * * *